Jan. 1, 1952  R. J. POUIT  2,580,591
JET ENGINE HAVING A PLURALITY OF TURBOCOMPRESSORS
OPERABLE IN PARALLEL OR IN SERIES
Filed Oct. 26, 1945  4 Sheets-Sheet 1

INVENTOR
ROBERT JEAN POUIT
BY Mock + Blum
ATTORNEYS

INVENTOR
ROBERT JEAN POUIT

BY Mock + Blum

ATTORNEYS

Patented Jan. 1, 1952

2,580,591

UNITED STATES PATENT OFFICE 2,580,591

JET ENGINE HAVING A PLURALITY OF TURBOCOMPRESSORS OPERABLE IN PARALLEL OR IN SERIES

Robert Jean Pouit, Lyon, France, assignor to Societe Industrielle Generale de Mecanique Appliquee (S. I. G. M. A.), Venisseux (Rhone), France, a society of France Application October 26, 1945, Serial No. 624,736
In France December 30, 1944

16 Claims. (Cl. 60—35.6)

1

The present invention relates to jet propulsion plants and more especially, although not exclusively, jet propulsion plants for aircrafts.

Such a plant includes at least one multiple stage air compressor device and at least one multiple stage motor device, the latter, which serves to drive the former, being fed with gases supplied by said compressor and in which a certain amount of fuel is burned.

In aircraft propelling plants making use of the reaction obtained by the ejection of gases under pressure, the system for the production of these gases is generally designed in such manner as to obtain the power necessary for the propulsion with a high efficiency when flying at high altitudes. On the other hand, it is often difficult to reach these altitudes and in particular to take off by means of the jet propulsion plant alone, due to the insufficient driving power at low altitudes of jet plants as known at the present time, which is due to the low efficiency of the compressor and motor devices at altitudes considerably lower than the altitude of utilization for which the plant has been studied.

Furthermore, it should be noted that the propelling efficiency of jet plants is very low when the translatory and ejection speeds are very different, which is the case for aircraft plants during the starting period. The jet plant must therefore be able to supply, during this period, an important amount of energy in the driving gases, which surplus should be kept up to an altitude as high as possible so as to reach in a time as short as possible the altitude of normal utilization, where the efficiency is maximum.

The chief object of my invention is to provide a jet propulsion plant capable of working satisfactorily under very different loads and different conditions, especially in the case of a propelling plant for an aircraft, which must, on the one hand, have a good efficiency at high altitudes of flight, and, on the other hand, be capable of supplying, at the take off and during the subsequent climb, the power necessary for these conditions of flight.

Other objects of my invention will result from the following detailed description of some specific embodiments thereof with reference to the accompanying drawings, given merely by way of example, and in which.

2

All these drawings relate to propulsion plants for aircrafts.

Figures 1, 2, 3:
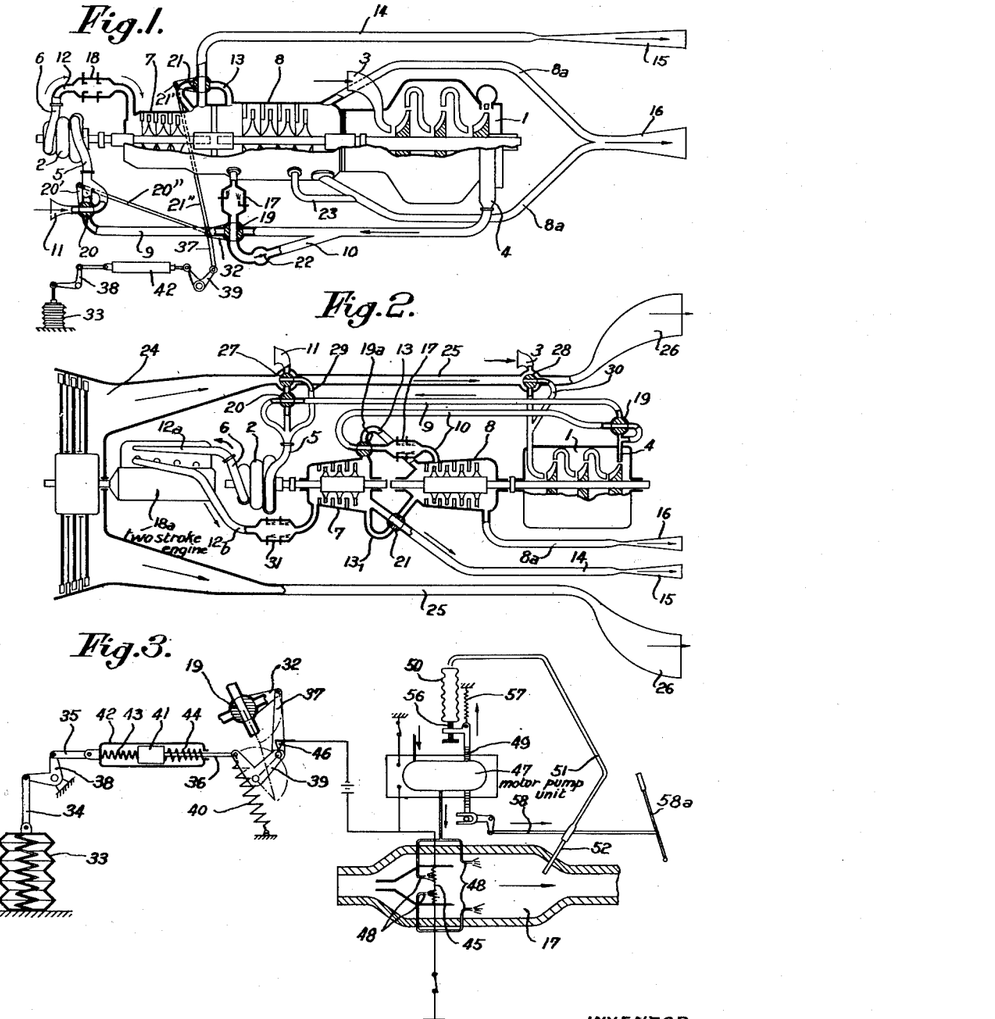
Fig. 1 diagrammatically shows a first embodiment of a power plant according to the invention.
Fig. 2 is a similar view of a second embodiment.
Fig. 3 is a diagrammatical view of an automatic control device for use according to the invention.

In the embodiment of Fig. 1, the means for producing the propelling gases are constituted exclusively by rotary machines.

The air compressor device is divided into two groups, to wit group 1 (low pressure group) and group 2 (high pressure group). Each of these groups can itself include several stages.

The inflow of air into the low pressure compressor group 1 takes place through air intake 3 and the air compressed in this group is discharged through conduit 4.

Concerning the high pressure compressor group 2, the air intake is at 5 and the outlet at 6.

The motor device of the plant includes a high pressure group constituted by a multiple stage gas turbine 7 and a low pressure group constituted by a multiple stage gas turbine 8. Of course, these two gas turbines 7 and 8 can be combined into a single turbine a plurality of stages of which constitutes the high pressure group while a plurality of other stages constitutes the low pressure group.

The shaft of the high pressure turbine 7 is coupled with that of the high pressure compressor 2 so as to drive it, while the shaft of the low pressure turbine 8 is coupled with the shaft of the low pressure compressor 1.

The two high pressure groups 7 and 2 constitute a unit and the two low pressure groups 1 and 8 constitute another unit. In each unit, the turbine is arranged and dimensioned in such manner as to supply the corresponding compressor with the energy strictly sufficient for ensuring therein the necessary compression.

According to the invention, means are provided for permitting at will either the operation in series of the two units thus constituted, or their operation in parallel.

For this purpose, the discharge conduit 4 of the low pressure compressor 4 is connected on the one hand, through a conduit 9 with the suction 5 of the high pressure compressor 2 and, on the other hand, through a branch conduit 10, with the intake of the low pressure turbine 8.

Furthermore, a second air intake 11, connected with the inlet 5 of the high pressure compressor 2, is provided for feeding this compressor with air from the surrounding atmosphere, and the delivery 6 of said compressor is connected through a conduit 12 with the inlet of the high pressure turbine 7 the exhaust of which can be connected, either through a conduit 13 with the input of the low pressure turbine 8, or through a conduit 14 with an expansion nozzle 15 through which the gases are discharged into the atmosphere in such manner as to ensure the propulsion of the aircraft. Furthermore, the exhaust of the low pressure turbine 8 is connected, through conduits 8a, with another expansion nozzle 16.

In each of the two feed conduits 10 and 12, leading respectively to the low and high pressure turbines 8 and 7, there is interposed a combustion chamber 17, 18, respectively, for burning a certain amount of fuel in the air under pressure intended to be fed to the corresponding turbine, before said air enters said turbine.

Finally, control means, for instance two-way cocks 19, 20 and 21, are provided in the various conduits for permitting either the operation in series or that in parallel of the two units that constitute the propulsion plant.

The position of cocks 19, 20 and 21 shown by Fig. 1 corresponds to the working in parallel, which is to be used on the ground or at low altitude. When the system is working in parallel, the air sucked in from the surrounding atmosphere enters simultaneously through intakes 3 and 11 into compressors 1 and 2, respectively. The air supplied by compressor 1 is fed through conduit 10 into combustion chamber 17, from which it passes to turbine 8, in which it expands, while driving said turbine, down to a pressure slightly above that of the surrounding atmosphere. When issuing from turbine 8, the air stream is fed through conduit 8a to expansion nozzle 16, from which it escapes into the atmosphere, producing by reaction a certain propelling force.

Concerning now the air compressed by compressor 2, it is heated in combustion chamber 18 before entering turbine 7. In driving this turbine, said air expands to a pressure slightly above the pressure of the surrounding atmosphere. It is fed through conduit 14 to nozzle 15 from which it escapes, also tranmitting a jet impulsion to the aircraft.

When the system is working in series, cock 19 is given a position such that it places the output 4 of compressor 1 in communication with the input 5 of compressor 2 and simultaneously cuts off the communication between, on the one hand, branch conduit 10 and, on the other hand, combustion chamber 17 and also the input of turbine 8, this combustion chamber being thus brought out of action.

Cock 20, in the position thereof corresponding to the working in series of the system, cuts off the communication between air intake 11 and the inlet 5 of the high pressure compressor 2. Finally, cock 21 on the one hand cuts off, for the position thereof corresponding to this working, the communication between the exhaust of turbine 7 and expansion nozzle 15, which is thus brought out of action, and on the other hand opens conduit 13, which connects the exhaust of turbine 7 with the intake of turbine 8.

Thus, the air admitted through air intake 3 is compressed a first time in compressor 1 and a second time in compressor 2, connected in series with the first compressor. This air has been heated in combustion chamber 18 so as to drive, when expanding, first turbine 7 and then turbine 8. Finally, the air issuing from turbine 8 through conduits 8a passes to nozzle 16 so as to be ejected into the atmosphere in such manner as to ensure the propulsion of the aircraft.

As above stated, the working in parallel of the two units 1—8 and 2—7 is used for the take off and for quick climbing to the normal altitude of utilization, that is to say when the plant is to supply a very high power. In this case, each of the two units in question, sucking in air directly from the atmosphere, where the pressure is relatively high, compresses a great weight of air to pressures that remain within the usual limits, this air serving to the combustion, in two combustion chambers 17 and 18, of a great amount of fuel. It should be noted that the low pressure unit 1—8, being of dimensions much greater than those of the high pressure unit 2—7, is capable, at low altitude, of supplying a power that is very important and considerably higher than that supplied by the high pressure unit.

The operation in series is used, in particular, for high altitude flying, which constitutes the normal conditions of working of the plant. For such operation, only the low pressure compressor 1 receives air from the surrounding atmosphere and only combustion chamber 18 is in action for burning fuel in the compressed air.

In order to obtain the best possible working of the plant, not only for the operation in series but also for that in parallel, it is advantageous to design the plant in such manner that, for high altitude flying, i. e. for instance at a height of 15,000 metres, where the atmospheric pressure is about 0.12 kg. per sq. cm., the discharge pressure of the low pressure compressor 1 is about 1 kg. per sq. cm., that is to say the atmospheric pressure on the ground level.

On the other hand, the plant is constructed in such manner that the exhaust pressure at the output of high pressure turbine 7 is a little higher than the atmospheric pressure in the vicinity of the ground level. This exhaust pressure, which is for instance equal to 1.5 kg. per sq. cm., ensures, on the one hand, for the working in parallel of the system, a suitable speed of ejection of the driving gases issuing from nozzle 15, and, on the other hand, for the working in series, a sufficient expansion in the low pressure turbine 8, the exhaust pressure of which, in such conditions of operations, is, at a height of about 15,000 metres, for instance 0.3 kg. per sq. cm., this value being sufficiently above the pressure of the surrounding atmosphere, which is 0.12 kg. per sq. cm., for ensuring a suitable speed of the gases issuing through nozzle 16.

It results from the preceding indications that the conditions under which the high pressure unit 2—7 is called to work are always substantially the same, both for the operation in series and the operation in parallel of the plant.

Concerning more especially the low pressure unit 1—8, the feed of fuel injected into combustion chamber 17 for the working in parallel is adjusted in such manner as preferably to obtain always the same speed of revolution of this unit for the working in parallel as for the working in series, thus ensuring always the same ratio of compression in the low pressure compressor 1.

Furthermore, and advantageously, the system is arranged in such manner that, the speeds of revolution being substantially constant, the speeds of introduction into the wheels of turbine 8 are also always substantially constant.

For this purpose, the driving gases coming, during the working in parallel, from the low pressure compressor 1, and which have been heated in combustion chamber 17, are introduced:

(a) Either into the first stage of the low pressure turbine 8 and this in the case of the volume of these gases being equal to that of the gases issuing during the working in series, from the high pressure turbine 7;

(b) Or into a stage of the low pressure turbine 8 downstream of the first stage (see for instance Fig. 2), this in the case of the volume of the gases coming from compressor 1 and combustion chamber 17 being greater than the volume of the gases coming, during the working in series, from the high pressure turbine 7, this excess being due for instance to the considerable increase of the temperature of the gases in said combustion chamber 17.

Finally, if, in the working in parallel, the volume of the gases coming from compressor 1 and combustion chamber 17 were smaller than the volume of the gases introduced into turbine 8 during the working in series, I may, either provide means for withdrawing, upstream of turbine 8, the gases that are being fed thereto during the working in parallel, for instance a throttle 22 provided in conduit 10, so as thus to obtain equality of the volumes of gases fed to said turbine during the working in parallel and the working in series respectively; or cause the gases from said turbine 8 to escape therefrom, during the working in parallel, at a point located upstream of the last wheel or wheels thereof, for instance through a conduit 23 which short-circuits the last wheel or wheels of turbine 8.

According to another embodiment of the invention which is particularly advantageous, I provide, instead of the combustion chamber 18 of Fig. 1, an engine of the piston type which is fed with air compressed by the high pressure compressor and the exhaust gases of which are introduced at a suitable pressure into the high pressure turbine 7. Preferably, this engine is of the two-stroke type, whereby the exhaust gases from this engine, which are constituted by the combustion gases and the excess of the scavenging air and feed air have a pressure substantially equal to the feed pressure of said engine.

Fig. 2 shows an example of this last mentioned construction.

In Fig. 2, I have designated all the parts that are identical or analogous to certain parts of Fig. 1 by the same reference numerals as on this figure. Furthermore, in Fig. 2, 18a designates the two-stroke engine which replaces the combustion chamber 18 of Fig. 1, and 12a and 12b are the feed conduit and the exhaust conduit of this engine.

The supplement of mechanical energy that is supplied by engine 18a serves, in the embodiment illustrated by Fig. 2, to drive a blower 24 which communicates, through conduits 25, with expansion nozzles 26 constituting supplementary propulsion elements.

This blower may also serve, for the working in parallel, to supercharge compressors 1 and 2 and, for the working in series, to supercharge compressor 1 also. For this purpose, I provide, both between air intake 3 and the input end of compressor 1 and between air intake 11 and the input end of compressor 2, two-way cocks 28 and 27 which, according to their position, either connect air intakes 3 and 11 with the respective compressors, or place the discharge conduit 25 of blower 24 in communication with one or/and the other of said compressors, the supercharging air being caused to pass through branch conduits respectively designated by 30 and 29.

The plant shown by Fig. 2 is further fitted with two communication conduits 13, 13₁ between the outlet of high pressure turbine 7 and the inlet of low pressure turbine 8.

In conduit 13 is interposed two-way cock 19a which, in one of its positions, allows air coming from the low pressure compressor 1 to flow through conduit 10 into combustion chamber 17, from which this air enters into one stage of turbine 8 located, for instance, downstream of the first stage of this turbine, whereas said cock 19a, in its other position, closes conduit 10 and opens conduit 13.

In conduit 13₁ is interposed a two-way cock 21 which, in one of its positions connects expansion nozzle 15 with the exhaust of turbine 7 and closes conduit 13₁, whereas, in the other position, it closes said communication and opens said conduit 13₁.

Finally, in some cases, it may be advantageous to interpose in the conduit 12b which connects the exhaust of engine 18a with the inlet of high pressure turbine 7, a supplementary combustion chamber 31 through which it is possible, under certain working conditions, to increase the power of the plant beyond its normal power in order to meet certain difficulties.

All that has been said in the description with reference to Fig. 1 concerning the keeping of the speed of revolution of unit 1—8 at a constant value and the means for keeping at a substantially constant value the speed of introduction of the gases into the low pressure turbine 8 also applies to the plant illustrated by Fig. 2.

Concerning the operation of this plant, it is, as a rule, the same as that of the plant of Fig. 1. During the take off and when flying at low and intermediate altitudes, for instance up to a height of 9,000 m. the two main units of the plant, to wit 2—18a—7 and 1—17—8 work in parallel, that is to say the gases expanded in the high pressure turbine 7 are fed to expansion nozzle 15 and those expanded in the low pressure turbine 8 are fed to expansion nozzle 16. Cocks 19, 19a and 21 are, during the working in parallel, in the positions shown by Fig. 2. Above the height above mentioned, the working in parallel is replaced by the working in series, for which combustion chamber 17 is taken out of action. In this case, cocks 19, 19a, 20 and 21 are brought into a position such that the air compressed by the low pressure compressor 1 is fed to the high pressure compressor 2, in which it is further compressed. This air is then introduced into engine 18a, for which it constitutes the feed and scavenging air. The gases escaping from this engine are introduced into turbine 7 where they undergo a first expansion; then they pass through conduits 13, 13₁ into the low pressure turbine 8 where they undergo a second expansion, down to a pressure higher than the atmospheric pressure by a difference such that a speed of ejection of the gases from nozzle 16 is obtained which ensures a good efficiency of the propulsion.

It should be noted that, for the working in series, for which cock 20 is in the position shown by Fig. 2, cock 27 must be in the position corresponding to the closing of branch conduit 29.

For the good working of the plant of Fig. 2, it is absolutely necessary to have the feed pressure of engine 18a kept at a substantially constant value for all altitudes of flight. For this reason, I have provided, in addition to the possibility of passing from the working in parallel of the two main units to the working in series and vice-versa, on the one hand means (cock 27 and air intake 11) permitting, when working in parallel, either of supercharging the high pressure compressor 2 by means of the air compressed by blower 24, or of feeding said compressor directly from the atmosphere, and, on the other hand, means (cock 28 and air intake 3) permitting, as well when operating both units in parallel as when operating them in series, either of supercharging compressor 1 by means of the air already compressed by blower 24, or of feeding said compressor 1 directly from the atmosphere.

Concerning the control of the cocks which serve to pass to the working in parallel from the working in series and vice-versa and to bring into and out of action combustion chamber 17 which serves merely when the units are working in parallel, this control may of course be performed manually. However, according to a particularly advantageous feature of the invention, this control is automatically performed, for instance in response to variations of the altitude at which the aircraft provided with the power plant is flying.

A control device of this type is shown by Fig. 3 by way of example.

Cock 19 is directly actuated by a control lever 32. Cock 20 is connected with this lever 32 through a lever 20' and a link 20". Cock 21 is connected to lever 32 through a lever 21' and a link 21". Said control lever 32 is operated by one or several barometric boxes 33. These barometric means may act either directly, as shown by the drawing, or, preferably, through the intermediate of electric, pneumatic, magnetic or hydraulic relays which, since they constitute devices known in themselves, need not be described here.

In the case, shown by the drawing, of a direct control, the manometric system 33 is connected with control element 32 through rods such as 34, 35, 36 and 37 and bell crank levers such as 38 and 39 at least one of which, for instance lever 39, is subjected to the action of a spring 40 which tends to keep element 32 in one or the other of the two positions for which cocks 19, etc. ensure the working of the units of the plant either in series or in parallel. Between bell crank lever 39 and manometric means 33, there is interposed an elastic connection constituted, for instance, by a piston 41 and a cylinder 42 cooperating together through the intermediate of two springs 43 and 44 having mutually opposing actions.

In order to bring combustion chamber 17 into or out of action, I combine with the parts above mentioned means for igniting the fuel injected into said chamber when passing from the working in series to the working in parallel. For this purpose, chamber 17 is provided with a platinum wire 45 electrically heated through an electric circuit which is closed in the position shown by Fig. 3, which corresponds to the working in parallel, this circuit being closed through a contact element 46 in contact with lever 39.

The same electric circuit may advantageously be used for feeding current to the electric motor of the motor pump unit 47 which feeds fuel to the burners of chamber 17.

This device works as follows:

On the ground, this device is in the position shown by Fig. 3, which corresponds to the working in parallel. After the take off and as the aircraft is climbing, manometric means 33 expand. This movement is transmitted through connection 34, 38, 35 to cylinder 42, which thus compresses spring 43. Piston 41 is first kept in fixed position, due to the preponderating action of spring 40 on element 39, whereby the position of the cocks corresponding to the working in parallel remains unchanged.

However, when a certain height has been reached, for instance at a height of 9,000 metres, the action of spring 43 causes lever 30 to swing into its other position, for which the cocks are brought into respective positions corresponding to the working in series and the circuit to 45 is opened, which stops the working of the fuel pump 47. The whole system is kept in this new position owing to the action of spring 40 which now occupies a position symmetrical with respect to its initial position and for which the action of spring 44, which is more and more flattened as the altitude increases, is overcome by that of spring 40.

When the aircraft moves toward the ground, the system works automatically in the opposite way, so as to be brought back into its initial position when the height drops below 9,000 metres.

In some cases, it may be advantageous to provide means for limiting, under certain conditions, the amount of fuel injected into combustion chamber 17 so as thus to prevent the temperature of the gases used for propulsion from exceeding a given admissible value.

This limiting device is also shown by Fig. 3 and is essentially constituted by a deformable box 50 cooperating with a rod 49 which constitutes the quantitative adjustment means for fuel pump 47.

This box 50 is connected with a fluid thermometer 51 subjected, through a connection 52, to the temperature of the gases as they leave combustion chamber 17. This deformable box 50, which expands more and more as the temperature of the gases rises and which gradually contracts when this temperature drops, constitutes an abutment limiting the movement of rod 49 in the direction corresponding to increases of the amount of fuel injected into the combustion chamber. Preferably, this rod is urged by a spring 57 in such manner that an adjustable finger 56 tends to bear against the bottom of box 50 which acts as an abutment. A control 58, 58a permits of reducing the amount of fuel that is injected to a value below that corresponding to the maximum fixed by abutment 50.

According to another feature of the invention, means are provided for burning a certain supplementary amount of fuel between the two successive stages of the motor device constituted by turbines 7 and 8, preferably by making use, for the working in series, of combustion chamber 17 which, normally, is employed only for the working in parallel.

Figure 4:
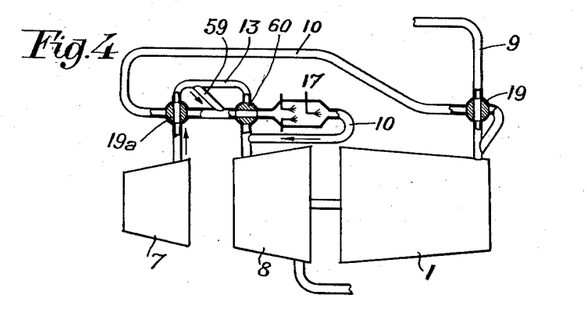
Fig. 4 shows a modification of either of the embodiments of Figs. 1 and 2.

According to the embodiment illustrated by Fig. 4, this combustion of a supplementary amount of fuel takes place, for the working in series, between the high and low pressure turbines 7 and 8, and it is intended to bring, for a certain time, the power of the plant beyond its normal value, for instance in order to increase the climbing speed of the aircraft so that it can get quicker to its normal flying height.

As shown by Fig. 4, a two-way cock 60 is interposed in conduit 13 and also in conduit 10 and a point of conduit 13 located between cocks 19a and 60 is connected through a branch pipe 59 with a point of conduit 10 also located between cocks 19a and 60.

When cocks 19a and 60 are in the position shown by Fig. 4, the gases flowing out from turbine 7 pass, before entering turbine 8, through combustion chamber 17 in which they are heated by the combustion of a certain amount of fuel in said chamber. If it is preferred to have the working in series without this supplementary heating, cock 60 is turned in such manner as to cut off branch conduit 59 and to restore direct communication between turbines 7 and 8.

Still another feature of the invention relates to the combustion in a combustion chamber such as 17 and 18 and its object is to obtain a spontaneous combustion, that is to say a combustion which requires neither the use of fuel igniting means nor long flames, which permits of making the combustion chamber of reduced size and weight.

According to this feature, a portion of the air supplied for instance by compressor 1 for being fed, when working in parallel, to combustion chamber 17 is introduced into an auxiliary combustion chamber where a relatively considerable amount of fuel is burned so as to obtain a temperature such that this portion of the air, after it is mixed with the remainder of the air fed by compressor 1, gives a mixture sufficiently hot for ensuring the spontaneous combustion of the fuel injected into the main combustion chamber.

Figure 5:
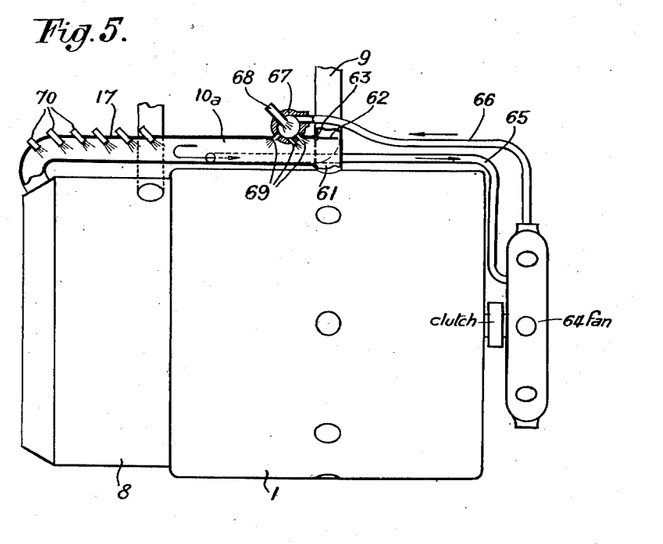
Fig. 5 shows a fuel combustion device for use in a plant according to the invention.

An embodiment of the feature in question is shown by Fig. 5, according to which the low pressure compressor 1 and the low pressure turbine 8 are disposed immediately one behind the other. The discharge of the low pressure compressor is shown at 61. From this discharge start, on the one hand conduit 9 which connects the low pressure compressor with the high pressure compressor and, on the other hand, a conduit 10a connecting 61, through combustion chamber 17, with the low pressure turbine 8. A valve 62 pivoted about an axis 63 closes, in its horizontal position shown by the drawing, conduit 9 and places 61 in communication with conduit 10a; in its vertical position, shown in dotted lines, this valve closes conduit 10a and opens conduit 9.

On the common axis of turbine 8 and compressor 1 is mounted a fan 64 which can be uncoupled for the working in series and which sucks in air from conduit 10a through tube 65. The air thus sucked in is sent by fan 64 through a tube 66 into an auxiliary combustion chamber 67 provided with fuel injection means 68. Chamber 67 is mounted on conduit 10a with the inside of which it communicates through apertures 69. Fig. 5 shows that the place where tube 65 sucks in air from conduit 10a is located on the downstream side of apertures 69 through which the air heated in auxiliary combustion chamber 67 is returned into the main air stream.

Finally, combustion chamber 17, which is but an extension of conduit 10a, is provided with a plurality of fuel injectors 70.

The auxiliary combustion chamber arrangement of Fig. 5 works as follows:

During the working in parallel, for which valve 62 is in the horizontal position shown by Fig. 5, the compressed air that leaves compressor 1 with a temperature of, for instance, 320°, enters conduit 10a and is immediately mixed with the very hot air that is flowing out from apertures 69 and which is, for instance, at a temperature of 1500° C. The temperature of the mixture thus formed is sufficiently high (for instance 470°) for ensuring spontaneous and quick combustion of the fuel which is injected through injectors 70 into the stream of air flowing through combustion chamber 17. The combustion of this last mentioned fuel raises the temperature at the outlet of the main combustion chamber to, for instance, 680° C.

A portion of the mixture that is formed, immediately upon the entering of air into conduit 10a, by the adjunction of very hot air issuing from auxiliary combustion chamber 67 is constantly sucked by fan 64 and returned to the auxiliary combustion chamber. As this portion is already at the initial temperature of the mixture, that is to say about 470°, spontaneous combustion is also ensured in the auxiliary combustion chamber. Besides, even if the suction by fan 64 took place at a point upstream of apertures 69, there would be no difficulty in ensuring a steady combustion in the auxiliary combustion chamber, by making, for instance said chamber in the form of a hot bulb the wall of which, once heated to a sufficient temperature, would remain hot owing to the combustion that takes place therein.

The provision of an auxiliary combustion chamber such as 67 makes it possible to obtain an extremely quick and complete combustion without requiring igniting means, whereby the size of the main combustion chamber 17 can be considerably reduced.

The plants according to the invention that are shown by Figs. 6 to 9 inclusive are arranged in such manner as to ensure, for the working in parallel, an interconnection between the respective gas circuits that feed the turbine groups, this interconnection being preferably obtained through a common manifold chamber from which all these groups are fed with gas.

This intercommunication permits of compensating for the difference that may exist, for the working in parallel, between the output of one of the compressor groups and the requirements of the corresponding gas turbine group, by making use of the surplus output supplied by the other compressor group with respect to the requirements of the turbine group that corresponds to this last mentioned compressor group.

The gases admitted into the manifold chamber may be constituted either solely by air under pressure or, at least partly, by a mixture of air and combustion gas and this especially when at least a portion of the driving gases is supplied by an auto-generator of the piston type constituted by a motor element and a compressor element, the second element being driven by the first and supplying it with scavenging and combustion air, the exhaust gases from the motor element constituting the driving gases to be supplied by the auto-generator.

Figure 6:
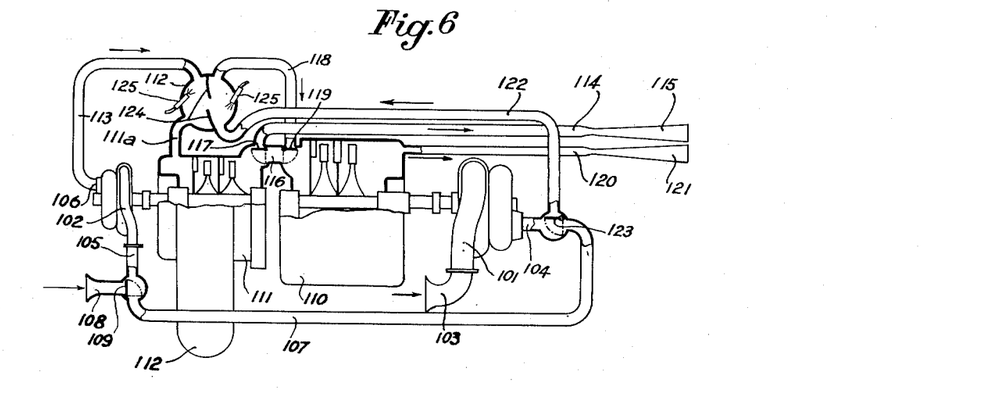
Figs. 6 to 8 inclusive are diagrammatical views, partly in section and partly in elevation, of three other embodiments of a propelling plant according to the invention.

The plant shown by Fig. 6 includes a compressor device divided into a low pressure group 101 and a high pressure group 102, each of these groups being constituted by a rotary blower.

The low pressure compressor group 101 receives air from the atmosphere at 103 and discharges compressed air at 104.

The high pressure compressor group 102 receives air at 105 and discharges it at 106. The discharge end 104 of the low pressure compressor group 101 is connected with the inlet 105 of the high pressure compressor group 102 through a conduit 107. This inlet 105 of the high pressure compressor 102 can further be connected with an air intake 108 for the direct feed of air from the atmosphere to this high pressure compressor. A valve 109 closes, in one of its positions (that shown in solid lines on the drawing), this last mentioned air intake thus connecting the delivery end 104 of the low pressure compressor with the inlet 105 of the high pressure compressor, while this valve 109, in its other position (shown in dotted lines) cuts off the communication between delivery end 4 and inlet 105 and connects this inlet with air intake 108.

Compressors 101 and 102 are driven by a low pressure gas turbine group 110 and a high pressure gas turbine group 111, respectively.

The high pressure turbine 111 has its inlet connected through conduit 111a with a manifold chamber 112 which communicates, through conduit 113, with the delivery end 106 of the high pressure compressor 102.

The exhaust of turbine 111 is connected, on the one hand, through a conduit 114, with a propelling nozzle 115 and, on the other hand, through a conduit 116, with the inlet of the low pressure turbine 110. A valve 117 closes one of these communications and opens the other, for one position of said valve, and vice-versa for the other position of said valve.

The inlet of the low pressure turbine 110 is further connected to manifold 112 through a conduit 118, a valve 119 being provided opening or closing at will this communication while further closing or opening, respectively, the communication with the exhaust of the high pressure turbine 111.

The exhaust of the low pressure turbine 110 is connected through conduit 120 with a propelling nozzle 121.

Finally, the exhaust 104 of the low pressure compressor 101 is also connected with manifold chamber 112 through a conduit 122, a valve 123 serving to close 122 and open 107, or vice-versa.

On the inside of manifold chamber 112 are provided partitions 124 leaving passages between them whereby the two compartments formed inside chamber 112 by these partitions and respectively interposed between conduits 113, 111a and 118, 122 communicate together. Each of these compartments is provided with injectors 125 for injecting fuel into the air present in chamber 112, which is thus heated by the combustion of this fuel.

The plant illustrated by Fig. 6 works in the following manner:

When the aircraft on which this plant is fitted is flying at high altitude, valves 109, 117, 119 and 123 are in the positions shown in solid lines on the drawing, for which both the compressor device 101—102 and the gas turbine device 110—111 are working in series. Air is sucked in from the surrounding atmosphere by low pressure compressor 101 and delivered with a certain pressure to the high pressure compressor 102 in which it is further compressed, before being sent into manifold chamber 112. In this chamber the air is heated by the combustion of the fuel injected through the injectors 125 mounted in the left hand compartment of said chamber. This hot air under pressure first expands in the high pressure turbine 111, thus driving it, and then in the low pressure turbine 110, from which it passes to nozzle 121, escaping therefrom into the atmosphere so as to exert the desired propelling action.

The compressor and motor devices are constructed in such manner that the efficiency of the turbines is maximum, for this working in series, at high altitudes, which are the normal flying altitudes.

For the take off and for flying at low altitude, the plant must be capable of developing a very high power. For this purpose, the two units formed, on the one hand by the low pressure compressor 101 and the low pressure turbine 110 and, on the other hand, by the high pressure compressor 102 and the high pressure turbine 111, are caused to work in parallel.

In order to obtain this result, valves 109, 117, 119, 123 are brought into the respective positions thereof shown in dotted lines. The low pressure compressor 101 then delivers the air it has compressed, through conduit 122, directly into manifold chamber 112, where this air is heated by the fuel injected, in particular, by the injectors provided in the right hand compartment of said chamber 112. The air thus heated is introduced through 118 into the low pressure turbine 110 and after driving this turbine escapes through propelling nozzle 121.

Parallel with low pressure compressor 101, the high pressure compressor sucks in air from the atmosphere through air intake 108 and sends compressed air into manifold chamber 112. As both compressors, to wit the high pressure one and the low pressure one, have the same ratio of compression, the delivery pressures of these compressors are substantially the same. The air fed by compressor 102 is also heated in chamber 112 by the combustion of fuel injected into the left hand compartment of said chamber, and this air is subsequently fed to the high pressure turbine 111, so as to drive it and finally to escape through propelling nozzle 115.

As the two compartments of manifold chamber 112 communicate together, an excess of air under pressure supplied by one of said compressors which cannot be absorbed by the corresponding turbine is absorbed by the other turbine which is underfed by its compressor.

Therefore, during the working in parallel, a good efficiency of the plant is maintained owing to the intercommunication between the circuits of the two units that constitute this plant.

Figures 7, 7A, 7B, 9:
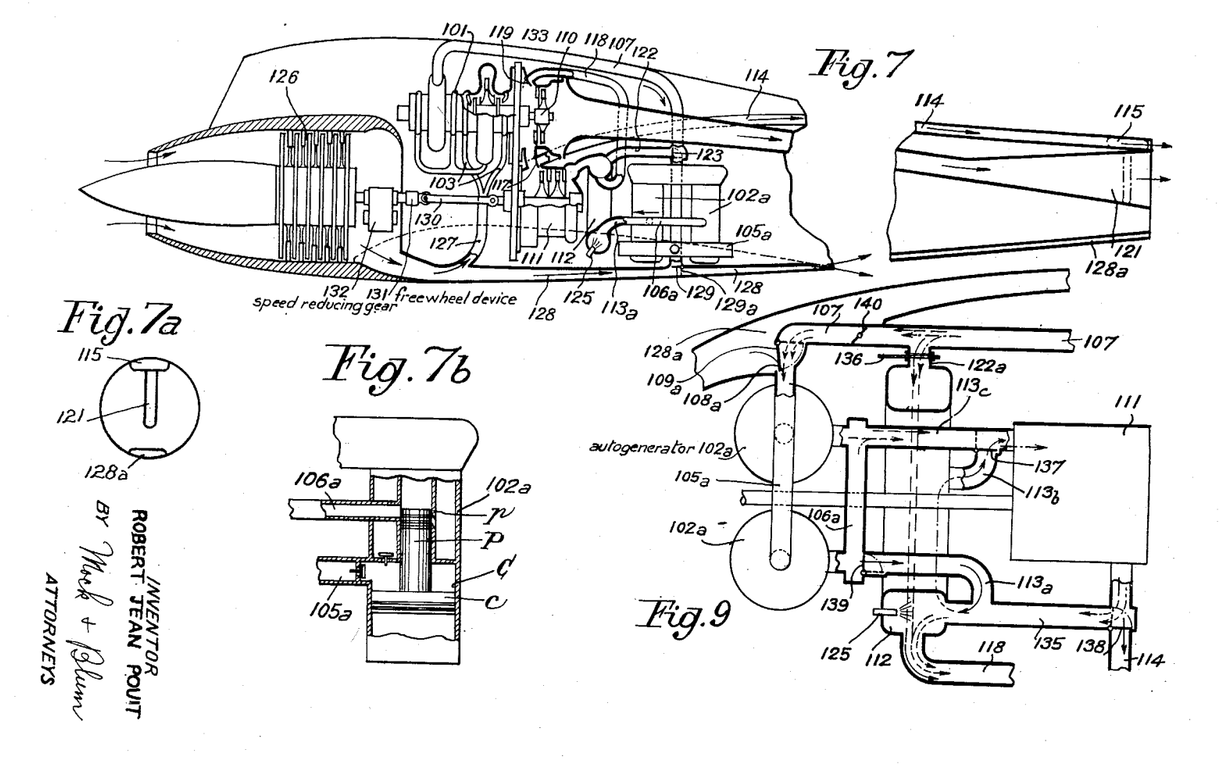
Fig. 7a is a rear end view corresponding to Fig. 7.
Fig. 7b is a view, partly in section, of an element of the structure of Fig. 7.
Fig. 9 is a view on an enlarged scale of a part of the plant shown by Fig. 8.

In the embodiment shown by Fig. 7, the high pressure compressor 102 of the system of Fig. 6 is replaced by a group of auto-generators, including for instance two auto-generators 102a (see Fig. 7b), each of said generators including a compressor portion (piston C and cylinder c) and a power portion (piston P and cylinder p) which drives said compressor portion and delivers hot gases under pressure.

The admission to the compressor portions of said generators is designated by reference character 105a, while the exhaust of the power portions is designated by 106a.

As the compressor elements of the auto-generators are driven by the motor elements of these machines, it is no longer necessary for the high pressure turbine 111 to drive the high pressure compressor group. Therefore, in this embodiment, this turbine is utilized for driving a blower 126 which, for the working in series, supercharges the low pressure compressor 101 (which in the drawing is shown as having two stages) and feeds one or several propelling nozzles, whereas, for the working in parallel, this blower supercharges both the group of auto-generators 102a and the low pressure compressor 101.

For this purpose, the delivery of blower 126 is connected, on the one hand and in a permanent manner, with the inlet 103 of compressor 101, through conduit 127, and, on the other hand, through conduit 128 and according to the position of valve 129, either with the admission 105a of auto-generators 102a or with propelling nozzles 128a Turbine 111 is connected with blower 126 through a Cardan shaft 130, a free wheel 131 and a variable ratio speed reducing gear 132. This speed reducing gear is fitted, in the known manner, with synchronizing means and permits of passing from one gear ratio to another without uncoupling.

The low and high pressure turbines 110 and 111, and also the low pressure compressor 101, are mounted on a common support 133. Manifold chamber 112, which serves, during the working in parallel, to the common feed of both turbines 110 and 111, is provided with fuel injectors 125 preferably mounted opposite the point where the gases produced by the group of auto-generators enter said manifold chamber. These gases, which are already at a relatively high temperature, and which contain a considerable proportion of oxygen, ensure the spontaneous combustion of the fuel that is injected. As a consequence of this combustion, they are brought to a high temperature and, in the working in parallel, they are mixed in manifold chamber 112 with the air compressed by the low pressure compressor, this air being introduced into this collecting chamber through conduits 107 and 122.

The propelling nozzles 115 and 121 may be arranged in such manner that the planes in which they are flattened are normal to each other, said planes being, for instance, vertical for nozzle 121 and horizontal for nozzle 115 (Fig. 7a).

The operation of the device shown by Fig. 7 is as follows:

For flying at high altitude, valves 117, 119, 123 and 129 are in the position shown in solid lines by the drawing.

The air compressed by blower 126 is partly absorbed by the low pressure compressor 101, while the remainder of this air feds, through conduit 128, propelling nozzles not shown by the drawing and which preferably open into the atmosphere close to the trailing edges of the aircraft wings.

The air compressed by compressor 101 is introduced into the auto-generators where it first undergoes a further compression for subsequently scavenging and feeding the motor cylinders of these auto-generators, which feed hot gases under pressure, through conduit 113a to manifold chamber 112. As these gases have already been heated by the fuel burned in the auto-generators, it is not absolutely necessary to inject into said gases a supplementary amount of fuel as they pass through chamber 112. However, in some cases, it is advantageous to do so. From manifold chamber 112, the gases are fed to turbine 111, where they undergo a first expansion. Then, they pass to turbine 110 where they undergo a second expansion, after which they finally escape through propelling nozzle 121.

For operation in parallel, valves 117, 123 and 129 are brought into the position shown in dotted lines.

In this position, blower 126 supercharges both the low pressure compressor 101 and the compressor elements of generators 102a (since valve 129 is in the position 129a shown in dotted lines for which conduit 128 opens into admission 105a). The air discharged by the low pressure compressor and also the gases supplied by the auto-generators are introduced into manifold chamber 112 with substantially the same pressure. The mixture thus obtained in said manifold chamber is heated by injection of fuel through injectors 125. Then the gases pass from the manifold chamber on the one hand into the high pressure turbine 111, from which, after having driven said turbine, they escape through conduit 114 into nozzles 115, and, on the other hand, into turbine 110, from which they escape into nozzle 121. Manifold chamber 112, which ensures the desired intercommunication between the two parallel circuits for the gases, compensates for the differences that may exist between the outputs of the compressors and the requirements of the turbines of the two parallel branch circuits respectively, as above explained with reference to Fig. 6.

The plant shown by Figs. 8 and 9 differs from those of Figs. 6 and 7 in that it permits of working not only in parallel and in series but also with an interconnection between the various elements of the system that corresponds to what will be hereinafter called "compound" working. This compound working will be preferably used for flying at intermediate altitude, while the working in parallel is employed for flying at low altitude and the working in series for flying at high altitude.

During this compound working, the low pressure turbine 110 is fed with a mixture constituted, on the one hand, by at least a part of the gases which have already been expanded to a certain degree in the high pressure turbine and, on the other hand, by at least a part of the air fed by the low pressure compressor group 101, a certain amount of fuel being preferably burned in this air or in said mixture, either during or after after the formation of the latter.

Figure 8:
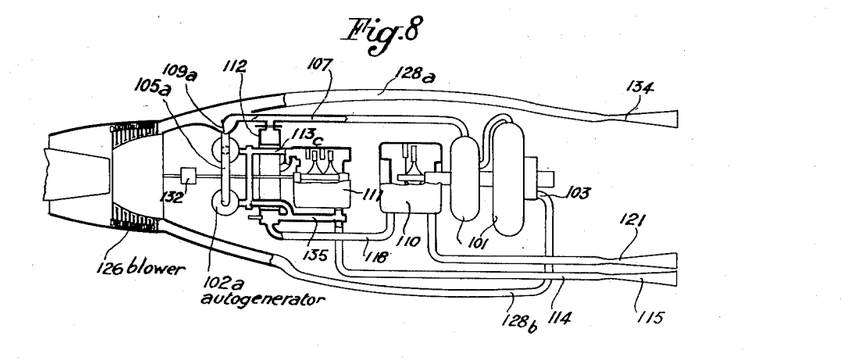

The plant shown by Figs. 8 and 9 is provided, same as that of Fig. 7, with a group of auto-generators which constitute the high pressure compressor group, and with a blower 126, driven by the high pressure turbine 111. This blower serves on the one hand to feed a propelling nozzle 134 and, on the other hand, to supercharge either the low pressure compressor group 101 alone, for the compound working or the working in series of the plant, or both the high pressure and low pressure compressor groups for the working in parallel.

For this purpose, the delivery of blower 126 is connected to propelling nozzle 134 through a conduit 128a from which branches off an air intake 108a provided with a valve 109a and which serves to the supercharging of auto-generators 102a during the working in parallel. Furthermore, the delivery of blower 126 is connected through conduit 128b with the inlet 103 of the low pressure compressor group which includes, in the plant shown by Fig. 8, two stages of compression.

On conduit 107 which connects the delivery of the low pressure compressor group with the inlet 105a of auto-generators 102, there is mounted a conduit 122a directly connecting conduit 107 with manifold chamber 112 which acts as combustion chamber.

Concerning the exhaust manifold 106 of generators 102a, it is connected, on the one hand, through conduit 113c, directly to the inlet of the high pressure turbine 111 and, on the other hand, through conduit 113a, with combustion chamber 112, the latter being connected with the inlet of the high pressure turbine 111 through conduit 113b and with the inlet of the low pressure turbine 110 through conduit 118. The exhaust of the high pressure turbine is connected, on the one hand, through conduit 135, with combustion chamber 112, and on the other hand, through conduit 114, with a propelling nozzle 115.

The fuel injectors 125 are mounted in combustion chamber 112 preferably opposite the outlets of conduits 135 and 113a. This arrangement has for its effect considerably to accelerate the combustion of the fuel since the gases coming from these conduits and which contain a considerable excess of oxygen are at a high temperature, which may be about 600° C. when the gases come directly from the auto-generators, or about 450° C. when these gases have already expanded in high pressure turbine 111.

Finally, the plant includes a closing slide-valve 136 which permits of closing conduit 122a, and two-way cocks or valves 137, 138 and 139, and also a throttle 140 provided in conduit 107 downstream of branch conduit 122a.

This system works in the following manner:

During the working in parallel indicated by the arrows in solid lines (Fig. 9), valve 136 is in the position corresponding to the opening of conduit 122a, valve 109a is in the position in which it opens air intake 108a and closes conduit 107, valve 137 is in the position in which it closes conduit 113c and connects conduit 113b with the inlet of turbine 111, valve 138 is in the position in which it closes conduit 135 and opens the communication between the exhaust of turbine 111 and conduit 114, and valve 139 is in the position in which it opens conduit 113a.

Both the auto-generators 102a and the low pressure compressor group 101 are fed with compressed air by blower 126, and they deliver air and gases, respectively, substantially at the same pressure, into combustion chamber 112, where the mixture thus constituted is heated by the combustion of fuel injected through injectors 125. A portion of this mixture is then introduced into turbine 111, from which it escapes toward nozzle 115, while the other portion of the mixture is introduced into turbine 110, from which it escapes toward propelling nozzle 121. This working in parallel, which is utilized for the take off and for flying at low altitude therefore corresponds to the feature of the invention according to which there is an intercommunication between the two parallel circuits of gases, this intercommunication being ensured by the provision of a common combustion chamber 112.

For the so-called "compound" working, which is indicated by the arrows in dot-and-dash lines, Fig. 9, and is to be used chiefly for flying at intermediate altitude, but which may also be used for flying at high altitude, air intake 108a is closed by means of valve 109a, branch conduit 122a is opened by means of valve 136, and valves 137, 138 and 139 are given the positions shown in Figs. 8 and 9 by solid lines.

For this compound working, blower 126 supercharges only the low pressure compressor group 101 which, on the other hand, feeds compressed air both to the inlet of auto-generators 102a and to combustion chamber 112. The gases produced by auto-generators 102a expand a first time in high pressure turbine 111 and are subsequently also introduced into combustion chamber 112, where they mix with the air coming directly from the compressor group 101. The mixture thus formed in chamber 112, after having been heated by the combustion of the fuel injected through injectors 125, flows toward low pressure turbine 110. From this turbine, the mixture is fed to propelling nozzle 121.

By suitably adjusting throttle 140, it is possible to obtain the desired pressure and flow rate of air fed to generators 102a, which is particularly advantageous for flying at various intermediate altitudes.

For the working in series, which is indicated by the arrows in dotted lines (Fig. 9) and which is to be used especially for flying at high altitude, conduit 122 is closed by means of valve 136. Air intake 108a is also closed by means of valve 109a, and valves 137, 138 and 139 are given the position shown in solid lines by Figs. 8 and 9.

The whole of the air fed by the low pressure compressor group is therefore fed to the auto-generators 102a and the gases produced by these generators are conveyed first to turbine 111 where they expand a first time, and then, through combustion chamber 112, where they may be heated, into low pressure turbine 110, where they expand a second time. Then they escape through nozzle 121.

It should be noted that, in some cases, the compound working can be used also at high altitude instead of the series working, and this especially in case of breakdown of one or several generators 102a. Furthermore, in order to obtain a plant of lighter weight, this plant can be devised in such manner as to permit only the parallel working and the compound working, the first one for flying at low altitudes, and the other for flying at high altitudes. Of course, the efficiency of such a plant is lower.

Whatever be the particular embodiment that is chosen, I obtain a jet propulsion plant having a high adaptability and efficiency.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A jet propulsion plant which comprises, in combination, at least two distinct compressor means, at least two distinct gas operated motor means, means for coupling at least one of said motor means with one of said compressor means for drive transmission from one to the other, gas communication means between said motor and compressor means, means forming at least one combustion chamber connected with said communication means, jet propulsion means connected to the exhausts of each of said motor means, and valve means for controlling said communication means adapted to form either a single gas circuit, including at least said two motor means in series, or two gas circuits in parallel, including each at least one compressor means, one combustion chamber and one motor means, said plant including means forming a manifold chamber inserted in both of said circuits in parallel upstream of said motor means, respectively.

2. A jet propulsion plant which comprises, in combination, at least two distinct compressor means, at least two distinct gas operated motor means, means for coupling at least one of said motor means with one of said compressor means for drive transmission from one to the other, gas communication means between said motor and compressor means, means forming at least one combustion chamber connected with said gas communication means, jet propulsion means connected with the exhausts of each of said motor means, and valve means for controlling said communication means adapted to form either a single gas circuit, including at least said two motor means in series, or two gas circuits in parallel, including each one compressor means, said combustion chamber and one motor means, whereby said combustion chamber is common to both circuits.

3. A jet propulsion plant which comprises, in combination, at least one low pressure compressor means and one high pressure compressor means, at least one low pressure motor means and one high pressure motor means, both of the gas operated type, means for coupling at least one of said motor means with one of said compressor means for drive transmission from one to the other, conduit means for connecting the delivery of said high pressure compressor means with the inlet of said high pressure motor means, an internal combustion engine of the piston type having its combustion chamber inserted in said conduit means, a propelling nozzle, means for connecting the exhaust of said low pressure motor means with said nozzle, an air intake for said low pressure compressor means, conduit means extending from the delivery of said low pressure compressor means to the inlet of said high pressure compressor means, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said high pressure compressor means, two-way valve means for connecting the inlet of said high pressure compressor means either with said last mentioned air intake or with said last mentioned conduit means, a propelling nozzle, and two-way valve means for connecting the exhaust of said high pressure motor means either with said last mentioned nozzle or with the inlet of said low pressure motor means.

4. A jet propulsion plant which comprises, in combination, at least two distinct compressor means, at least two distinct gas operated motor means, means for coupling at least one of said motor means with one of said compressor means for drive transmission from one to the other, gas communication means between said motor and compressor means, means forming at least two combustion chambers connected with said communication means, jet propulsion means connected to the exhausts of each of said motor means, valve means for controlling said communication means adapted to form either a single gas circuit, including at least said two motor means in series, or two gas circuits in parallel, including each one compressor means, one combustion chamber and one motor means, respectively, the means forming at least one of said combustion chambers being constituted by an internal combustion engine of the piston type, a blower coupled with said engine adapted to be fed with air from the atmosphere, a propulsion nozzle, and means for connecting the delivery of said blower with said nozzle.

5. A jet propulsion plant which comprises, in combination, at least two distinct compressor means, at least two distinct gas operated motor means, means for coupling at least one of said motor means with one of said compressor means for drive transmission from one to the other gas communication means between said motor and compressor means, means forming at least two combustion chambers connected with said communication means, jet propulsion means connected to the exhausts of each of said motor means, valve means for controlling said communication means adapted to form either a single gas circuit, including at least said two motor means in series, or two gas circuits in parallel, including each one compressor means, one combustion chamber and one motor means, respectively, the means forming at least one of said combustion chambers being constituted by an internal combustion engine of the piston type, a blower coupled with said engine adapted to be fed with air from the atmosphere, and means for connecting the delivery of said blower with the inlet of at least one of said compressor means.

6. A jet propulsion plant which comprises, in combination, at least two distinct compressor means, at least two distinct gas operated motor means, means for coupling at least one of said motor means with one of said compressor means for drive transmission from one to the other, gas communication means between said motor and compressor means, means forming at least two combustion chambers connected with said communication means, jet propulsion means connected to the exhausts of each of said motor means, valve means for controlling said communication means adapted to form either a single gas circuit, including at least said two motor means in series, or two gas circuits in parallel, including each one compressor means, one combustion chamber and one motor means, respectively, the means forming at least one of said combustion chambers being constituted by an internal combustion engine of the piston type, a blower coupled with said engine adapted to be fed with air from the atmosphere, a propulsion nozzle, means for connecting the delivery of said blower with said nozzle, and means for connecting the delivery of said blower with the inlet of at least one of said compressor means.

7. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, and two-way valve means for connecting the exhaust of said high pressure motor means either with said last mentioned nozzle or with the inlet of said low pressure motor means.

8. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, two-way valve means for connecting the exhaust of said high pressure motor means either with said last mentioned nozzle or with the inlet of said low pressure motor means, a blower coupled with said high pressure motor means so as to be driven by it, adapted to be fed with air from the atmosphere, a propulsion nozzle, and means for connecting the delivery of said blower with said nozzle.

9. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, two-way valve means for connecting the exhaust of said high pressure motor means either with said last mentioned nozzle or with the inlet of said low pressure motor means, a blower coupled with said high pressure motor means so as to be driven by it, adapted to be fed with air from the atmosphere, and means for connecting the delivery of said blower with the inlet of at least one of said compressor means.

10. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, two-way valve means for connecting the exhaust of said high pressure motor means either with said last mentioned nozzle or with the inlet of said low pressure motor means, a blower coupled with said high pressure motor means so as to be driven by it, adapted to be fed with air from the atmosphere, a propulsion nozzle, means for connecting the delivery of said blower with said nozzle, and means for connecting the delivery of said blower with the inlet of at least one of said compressor means.

11. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, two-way valve means for connecting the exhaust of said high pressure motor means either with said last mentioned nozzle or with the inlet of said low pressure motor means, a blower, means for coupling said blower with said high pressure motor means including a Cardan shaft, a free wheel, and a variable ratio speed reducing gear including synchronizing means adapted to permit gear changing without uncoupling, a propulsion nozzle, and means for connecting the delivery of said blower with said nozzle.

12. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, two-way valve means for connecting the exhaust of said high pressure motor means either with said last mentioned nozzle or with the inlet of said low pressure motor means, a blower, means for coupling said blower with said high pressure motor means including a Cardan shaft, a free wheel, and a variable ratio speed reducing gear including synchronizing means adapted to permit gear changing without uncoupling, and means for connecting the delivery of said blower with the inlet of at least one of said compressor means.

13. A jet propulsion plant which comprises, in combination, at least one low pressure compressor means, at least one auto-generator including a motor element and a compressor element, at least one low pressure motor means and one high pressure motor means, both of the gas operated type, means for coupling said low pressure motor means with said low pressure compressor means for drive transmission from one to the other, conduit means for connecting the delivery of said auto-generator compressor element with the inlet of said high pressure motor means, the combustion chamber of the motor element of said auto-generator being inserted in said conduit means, a propelling nozzle, means for connecting the exhaust of said low pressure motor means with said nozzle, an air intake for said low pressure compressor means, conduit means extending from the delivery of said low pressure compressor means to the inlet of said auto-generator compressor element, means forming a combustion chamber in communication with the inlet of said low pressure motor means, means for feeding fuel to said last mentioned combustion chamber, two-way valve means between said last mentioned conduit means and said last mentioned combustion chamber for directing the flow of compressed air from said low pressure compressor means either toward said last mentioned combustion chamber or toward said auto-generator compressor element, two-way valve means for connecting the inlet of said auto-generator compressor element either with said last mentioned air intake or with said last mentioned conduit means, a propelling nozzle, two-way valve means for connecting the exhaust of said high pressure motor means either with said last mentioned nozzle or with the inlet of said low pressure motor means, a blower, means for coupling said blower with said high pressure motor means including a Cardan shaft, a free wheel, and a variable ratio speed reducing gear including synchronizing means adapted to permit gear changing without uncoupling, a propulsion nozzle, means for connecting the delivery of said blower with said nozzle, and means for connecting the delivery of said blower with the inlet of at least one of said compressor means.

14. A jet propulsion plant for an aircraft which comprises, in combination, at least two distinct compressor means, at least two distinct gas operated motor means, means for coupling at least one of said motor means with one of said compressor means for drive transmission from one to the other, gas communication means between said motor and compressor means, means forming at least one combustion chamber connected with said communication means, jet propulsion means connected to the exhausts of each of said motor means, valve means for controlling said communication means adapted to form either a single gas circuit, including at least said two motor means in series, or two gas circuits in parallel, including each at least one compressor means, one combustion chamber and one motor means, and barometric means for operating said valve means in response to variations of altitude of the aircraft.

15. A jet propulsion plant which comprises, in combination, at least two distinct compressor means, at least two distinct gas operated motor means, means for coupling at least one of said motor means with one of said compressor means for drive transmission from one to the other, gas communication means between said motor and compressor means, means forming at least one main combustion chamber connected with said communication means, means for feeding fuel to said combustion chamber, jet propulsion means connected to the exhausts of each of said motor means, valve means for controlling said communication means adapted to form either a single gas circuit, including at least said two motor means in series, or two gas circuits in parallel, including each at least one compressor means, one combustion chamber and one motor means, an auxiliary combustion chamber, means for feeding fuel to said auxiliary combustion chamber, means for sending a portion of the gas on its way toward said main combustion chamber into said auxiliary combustion chamber, and means for returning said gas portion from said auxiliary combustion chamber toward said main combustion chamber to mix with the remainder of the gas stream on its way to said main chamber, whereby, after mixing, the whole gas stream is at a temperature such that fuel ignites spontaneously therein in said main combustion chamber.

16. A jet propulsion plant which comprises, in combination, at least two distinct compressor means, at least two distinct gas operated motor means, means for coupling at least one of said motor means with one of said compressor means for drive transmission from one to the other, gas communication means between said motor and compressor means, means forming at least one combustion chamber connected with said communication means, jet propulsion means connected to the exhausts of each of said motor means, valve means for controlling said communication means adapted to form either a single gas circuit, including at least said two motor means in series, or two gas circuits in parallel, including each at least one compressor means, one combustion chamber and one motor means, means for injecting fuel into said combustion chamber, means for limiting the amount of fuel fed by said injecting means, and means responsive to temperature variations in said combustion chamber for adjusting said limiting means.

ROBERT JEAN POUIT.

REFERENCES CITED

The following references are of record in the file of this patent:

UNITED STATES PATENTS

| Number | Name | Date |
|---|---|---|
| 608,969 | Parsons | Aug. 9, 1898 |
| 2,115,112 | Lysholm | Apr. 26, 1938 |
| 2,396,911 | Anxionnaz et al. | Mar. 19, 1946 |
| 2,411,227 | Planiol et al. | Nov. 19, 1946 |
| 2,466,282 | Sparrow | Apr. 5, 1949 |

FOREIGN PATENTS

| Number | Country | Date |
|---|---|---|
| 210,653 | Switzerland | Oct. 16, 1940 |